United States Patent [19]

Yonezaki et al.

[11] 4,158,754

[45] Jun. 19, 1979

[54] MOUNTING APPARATUS FOR COMMUNICATION EXCHANGE EQUIPMENT

[75] Inventors: Jimpachi Yonezaki, Yokohama; Yoshihiro Takahashi, Kawasaki; Toshihiko Shimada, Tama; Katsuo Okuyama, Kawasaki, all of Japan

[73] Assignee: Fujitsu Limited, Japan

[21] Appl. No.: 716,299

[22] Filed: Aug. 20, 1976

[30] Foreign Application Priority Data

Aug. 25, 1975 [JP] Japan .................................. 50-103162

[51] Int. Cl.² .............................................. H04Q 1/14
[52] U.S. Cl. ...................................... 179/98; 361/428; 361/429
[58] Field of Search ............... 179/91 R, 98; 361/428, 361/429, 340

[56] References Cited

U.S. PATENT DOCUMENTS

| | | | |
|---|---|---|---|
| 2,219,887 | 10/1940 | Bowly et al. | 179/98 |
| 2,712,916 | 7/1955 | Franz | 179/98 |
| 2,773,940 | 12/1956 | Lebedinsky | 179/91 R |
| 2,999,904 | 9/1961 | Lohs et al. | 179/91 R |
| 3,462,649 | 8/1969 | Stich | 179/98 |
| 3,652,806 | 3/1972 | Nakagami et al. | 179/98 |
| 3,755,630 | 8/1973 | Boyer | 179/98 |
| 3,780,351 | 12/1973 | Salmon et al. | 179/91 R |
| 4,002,856 | 1/1977 | Sedlacek et al. | 179/98 |

FOREIGN PATENT DOCUMENTS

| | | | |
|---|---|---|---|
| 1231763 | 1/1967 | Fed. Rep. of Germany | 179/98 |
| 1938952 | 2/1970 | Fed. Rep. of Germany | 179/98 |
| 1940255 | 2/1971 | Fed. Rep. of Germany | 361/428 |
| 2034177 | 1/1972 | Fed. Rep. of Germany | 179/98 |
| 2431262 | 1/1976 | Fed. Rep. of Germany | 361/428 |
| 439405 | 1/1965 | Switzerland | 179/98 |
| 1210338 | 3/1968 | United Kingdom | 179/98 |

OTHER PUBLICATIONS

Telephony Magazine; May 1904; American Electric Fuse Co. Advertisement.
K. H. Grunst, U. Jorke, S. Wendt; "Installation Technique for the ATZ 65 System"; Monthly Technical Review; Apr. 1972; vol. 16, No. 4, pp. 66–68.

Primary Examiner—Kathleen H. Claffy
Assistant Examiner—Randall P. Myers
Attorney, Agent, or Firm—Staas & Halsey

[57] ABSTRACT

A mounting apparatus for communication signals exchange equipment is described. The apparatus includes supporting poles, each of which is erected close to each of the components of the communication signals exchange equipment, and further includes frameworks which are assembled horizontally above said supporting poles and rigidly fixed to the top ends of said supporting poles. The supporting poles and frameworks are provided both for mechanically supporting said components and for distributing a large number of communication signals cables between one component and other components. The construction of both the supporting poles and frameworks is completed by the time said components are located at their desired positions.

18 Claims, 20 Drawing Figures

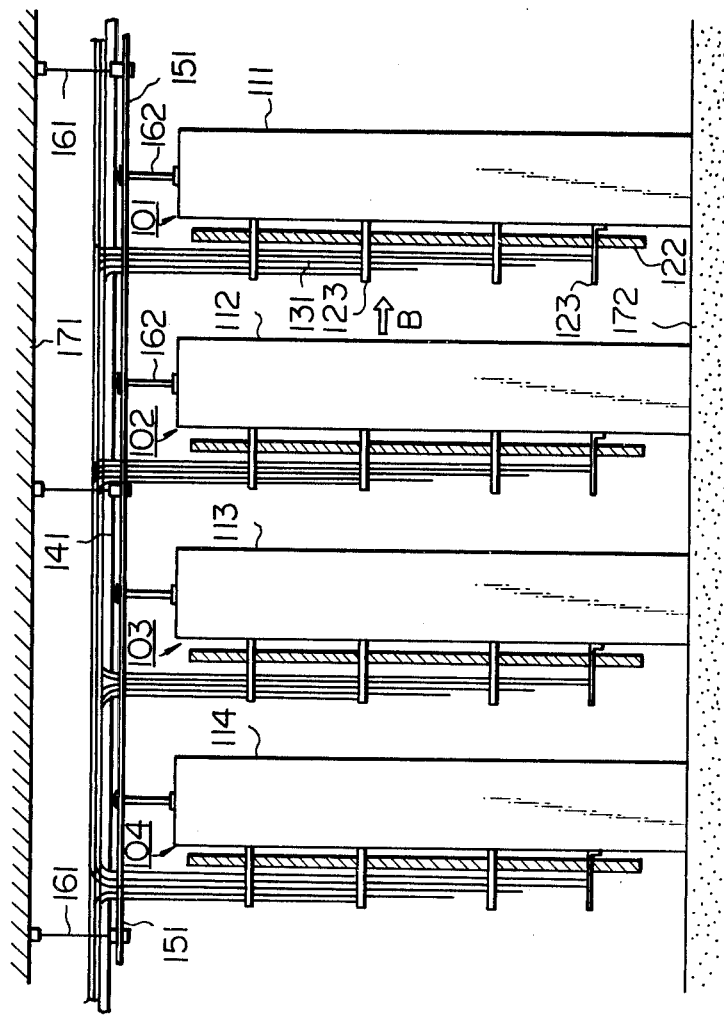

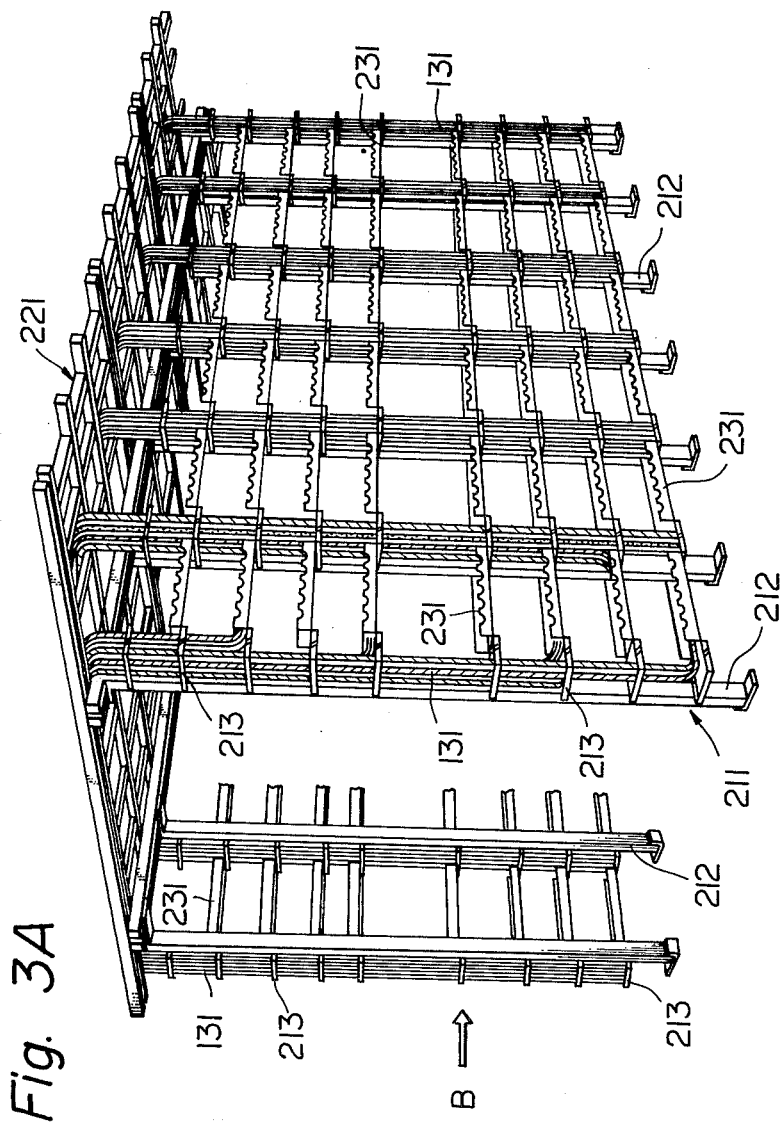

MOUNTING APPARATUS FOR COMMUNICATION EXCHANGE EQUIPMENT

BACKGROUND OF THE INVENTION

1. Field of the Invention

The present invention relates to a mounting apparatus for communication signal exchange equipment, and is particularly suitable for installing telephone exchange equipment.

2. Description of the Prior Art

In recent years, the demand for telephone sets has been increasing and, accordingly, it has been necessary to expand telephone networks. When the telephone networks are expanded, the number of subscriber lines are also increased. Consequently, a telephone exchange office has to deal with a large number of subscriber lines.

Originally telephone exchange equipment in a telephone exchange office was comprised of one mounting frame in which various kinds of electronic control units were contained. However, as the number of subscriber lines increased the telephone exchange equipment has had to be comprised of a plurality of mounting frames in each of which various kinds of electronic control units are contained. Since each of the electronic control units is relatively large and heavy, each of the mounting frames which contains many electronic control units is extremely large and heavy. Accordingly, it is difficult to transport a complete telephone exchange equipment comprised of a plurality of mounting frames from a manufacturing factory to the telephone exchange office.

In order to overcome the above mentioned difficulty, the following steps for installing the telephone exchange equipment have been provided. First, a plurality of mounting frames are produced in a manufacturing factory, in each of which mounting frames many cables are wired from one electronic control unit to another corresponding unit. Second, said plurality of mounting frames are transported from the factory to the telephone exchange office one by one, where frameworks which are located above the mounting frames and rigidly support said mounting frames have previously been constructed in the telephone exchange office. Third, each of the mounting frames is placed in a predetermined position in said office. Fourth, each of electronic control units of one mounting frame is electrically connected to a corresponding electronic control unit of another mounting frame by using a large number of cables.

The above mentioned four steps of the prior art have the following three defects. A first defect is that the length of time between the time when the mounting frames are placed in said office to the time when all of the electronic control units in said mounting frames can begin operation is extremely long. One reason for this is that the last step mentioned above cannot be started until all of the mounting frames have been placed in their predetermined positions in said office. Only when all of the mounting frames have been positioned can the cutting of each of said large number of cables to their desired length, the positioning of the end of each of the large number of cables at its desired position, and the distribution of each of the large number of cables through a predetermined path from one electronic control unit to another one be carried out. Another reason for the above mentioned first defect is that the cutting of the cables, the positioning of the ends of cables and the distribution of the cables is very time consuming and complicated. A second defect is that a transmission loss provided along each of the large number of cable becomes very large. This is because, since the distribution of all of the large number of cables from one component to other components is by way of overhead cable racks which are located above the components, the length of each of the cables becomes very long. A third defect is that, when the telephone exchange equipment is under construction, if it is necessary to connect some additional lead wires from some conductor pins of a printed circuit board in the electronic control unit to corresponding conductor pins of the connector of the same electronic control unit, the connection of said additional lead wires is not easily carried out.

SUMMARY OF THE INVENTION

It is an object of the present invention to provide a mounting apparatus which can overcome the above-mentioned three defects.

Another object of the present invention is to provide a mounting and support apparatus for electrical components which are to be electrically interconnected comprising support means which may be constructed and arranged at a site simultaneously with the manufacture of said electrical components so that it will be ready for installation of said electrical components when they are received at the site, and additional means for pre-arranging communication signal cables on said support means prior to installation of said electrical components and yet ready for quick and easy time saving electrical interconnection thereof once they are installed at said site.

A further object is to provide said apparatus having additional means to permit shorter and more direct electrical cables in order to reduce the transmission loss thereof.

A still further object is to provide said apparatus having additional means included so that lead wires may be easily connected between the electrical components and interconnected thereto once all have been installed at the site with a minimum of time and effort.

The present invention will become more apparent and its construction better understood from the following detailed description with reference to the accompanying drawings, in which:

FIG. 1A is a side elevational view showing an arrangement of components of telephone exchange equipment according to the prior art;

FIG. 3A is a perspective view, partially cut away, showing construction of both the cable supporting racks and the frameworks of FIG. 2, according to the present invention;

DESCRIPTION OF THE PREFERRED EMBODIMENTS

Figure 1B:
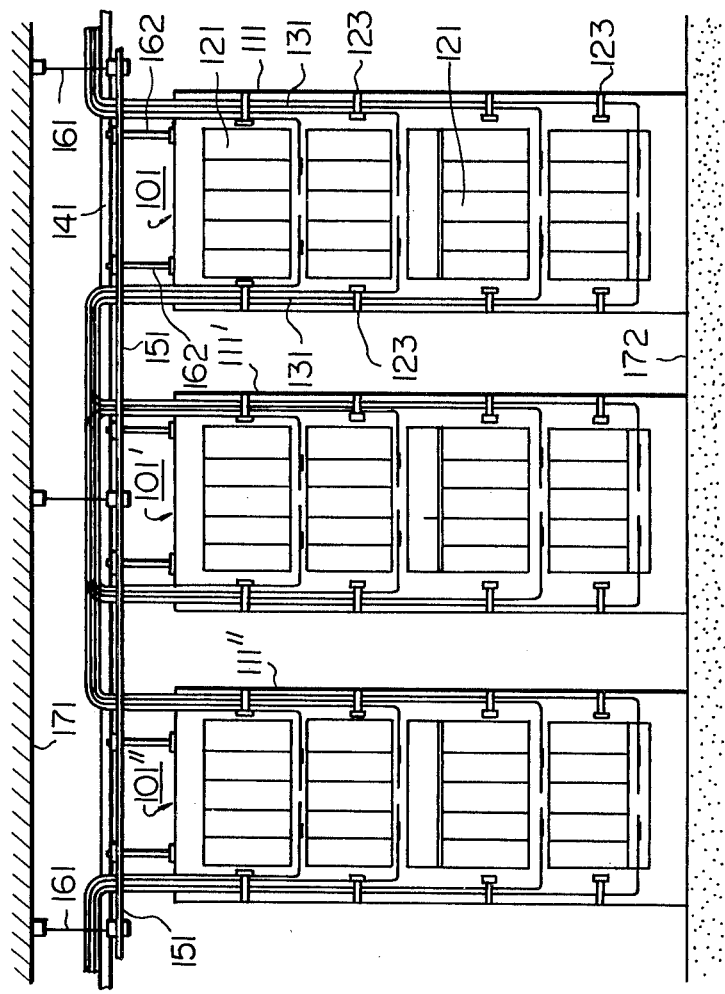
FIG. 1B is a front view of part of the arrangement in FIG. 1A seen from the arrow B in FIG. 1A.

FIG. 1A is a side elevational view showing an arrangement of components of telephone exchange equipment according to the prior art, and FIG. 1B is a front view of a portion of the same seen from the arrow B in FIG. 1A. In FIGS. 1A and 1B the reference numerals 101, 102, 103 and 104 respectively represent first, second, third and fourth components, in case there are four components, of the telephone exchange equipment. These components are arranged in a first direction as shown in FIG. 1A and are also arranged in a second direction perpendicular to the first direction as shown by the reference numerals 101, 101' and 101 in FIG. 1B. The reference numerals 111, 112, 113, 114 and 111', 111 respectively represent mounting frames. Since each of the above mentioned components of the telephone exchange equipment have the same construction, the following explanation is directed to only the component 101. The mounting frame 111 has, for example, four shelves (not shown) therein and each of the four shelves holds, for example, five electronic control units 121 (FIG. 1B). Each of the electronic control units 121 is detachable with respect to its shelf. Each of the electronic control units is mainly composed of a printed circuit board (not shown) a plurality of relays mounted on the printed circuit board and a plurality of integrated circuit elements mounted on the printed circuit board. The reference numeral 122 (FIG. 1A) represents inner cables which have already been wired in a manufacturing factory and electrically connect one unit 121 to another corresponding unit 121 both belonging to the component 101. The reference numeral 131 represents a large number of cables each of which electrically connects one electronic control unit 121 of one component to the corresponding electronic control unit of another component 102, 103, 104, 101' or 101. The cables 122 and 131 are fastened directly to the mounting frame 111 by cable support wires 123 shown in FIGS. 1A and 1B. The cables 131 are distributed on overhead cable racks 141 and then each of the cables 131 is led to the corresponding respective component. The overhead cable racks 141 are located on the frameworks 151. The frameworks 151 are rigidly supported by fixing bolts 161 which are fixed to a ceiling 171 of the telephone exchange office. The top of the mounting frame 111 is rigidly supported by suspension bolts 162 which are fixed to the frameworks 151. The bottom of the mounting frame 111 is rigidly fixed to a floor 172 of the telephone exchange office by means of bolts (not shown).

As previously mentioned, first a plurality of components, each of which is comprised of a mounting frame (refer to 111) electronic control units (refer to 121) and inner cables (refer to 122) are brought into the office and placed on the floor 172 at predetermined respective positions. Next, the top of each of the mounting frames (refer to 111) is rigidly connected to the frameworks 151 by means of suspension bolts (refer to 162) and the bottom of each of the mounting frames is rigidly connected to the floor 172 by means of other bolts. Then a large number of cables (refer to 131) are distributed from one component to other components by way of the overhead cable racks 141. Each of the cables is cut its desired length and one end of each of the cables is distributed to its desired position. Then the cables (refer to 122 and 131) are fastened by the cable support wire. Thereafter, one end of each of the cables is connected to a corresponding pin (not shown) of the electronic control unit (refer to 121), which pin is electrically connected to a corresponding terminal of a printed circuit board in the electronic control unit by means of a lead wire.

The mounting apparatus according to the present invention will now be explained. The essential feature of the present invention is that each of the cables (refer to 131 in FIGS. 1A and 1B) is distributed along its desired path at the same time the frameworks 151 are constructed, that is, before the time a plurality of components (refer to 101, 102, 103, 104, 101' or 101 in FIGS. 1A and 1B) are brought into a telephone exchange office. Accordingly, both the process in which a plurality of components are manufactured in a factory and the process in which each of the large number of cables is distributed along its desired path advance in parallel with each other. Consequently, the length of the construction time required between the time when the plurality of components are brought into the telephone exchange office to the time when all of said electronic control units of the components can begin operation, is extremely shortened. Other features of the present invention will become apparent from the following explanation.

Figure 2:
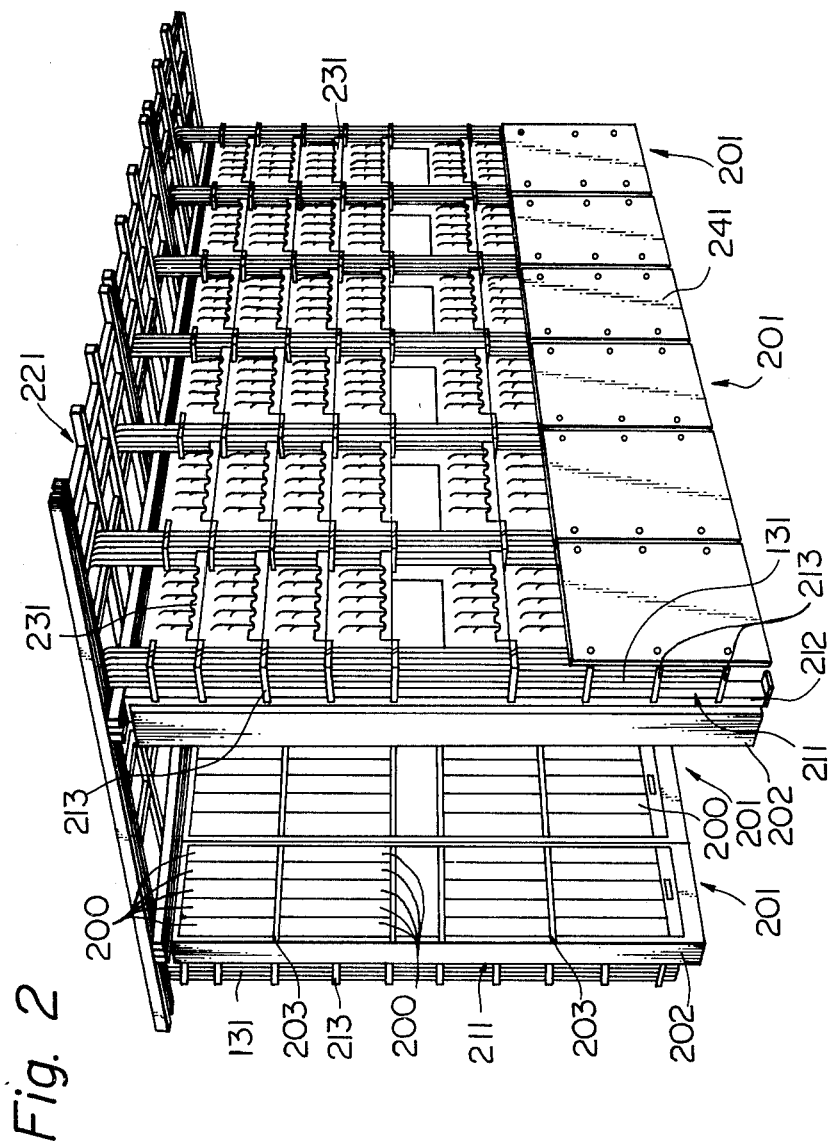
FIG. 2 is a perspective view showing an arrangement of components and mounting apparatus according to the present invention.

FIG. 2 is a perspective view showing an arrangement of components and a mounting apparatus according to the present invention. In FIG. 2, the reference numerals 201 respectively represent components (corresponding to the components 101, 102, 103, 104, 101' and 101" in FIGS. 1A and 1B), and each of the components 201 is located at a predetermined respective position on the floor. Each of the components 201 has a mounting frame 202 (corresponding to the mounting frames 111, 112, 113, 114, 111' and 111" in FIGS. 1A and 1B). The mounting frame 202 has shelves 203. On each of the shelves 203, a plurality of, for example five, electronic control units 200 are detachably located. The reference numerals 211 respectively represent cable supporting racks according to the present invention. Each of the cable supporting racks 211 is comprised of a supporting pole 212 and a plurality of cable guide rings 213. Each of the cable supporting racks 211 is erected close to and parallel to one side of the corresponding mounting frame 202. The supporting poles 212 are rigidly connected to frameworks 221 which have a grid-like shape. The frameworks 221 also act as overhead cable racks. The cables 131 extend vertically in the cable guide rings 213 and horizontally on cable supporting ducts 231. Each of the cable supporting ducts 231 is supported at both its ends by corresponding cable guide rings 213 by means of screws (not shown). The reference numerals 241 represent protective covers. Each of the protective covers 241 is attached at its both sides to corresponding cable guide rings 213.

FIG. 3A is a partial perspective view, showing a construction of the cable supporting racks 211 and the frameworks 221. It should be noted that the construction of the present invention shown in FIG. 3A will have been previously been built in the telephone exchange office by the time the components 201 (shown in FIG. 2) manufactured in the factory are brought into said telephone exchange office. First, each of the supporting poles 212 is fixed at its one end to the floor 172 (FIGS. 1A and 1B) at its predetermined position and is then erected therefrom. When all of the supporting poles 212 are erected, the frameworks 221 are assembled on the other ends of the supporting poles 212 and the frameworks 221 and the supporting poles 212 are connected together so as to form one body. Then the cable guide rings 213 are attached to each of the supporting poles 212. The cable guide rings 213 are positioned on each of the supporting poles 212 in such a manner, for example, that every two of the cable guide rings 213 arranged with a constant pitch will face the electronic control units 200 (FIG. 2) located on each of the shelves 203 (FIG. 2) at the time when both of which electronic control units 200 and shelves 203 are positioned close to the supporting poles 212. Next, each of the cable supporting ducts 231 is fixed at both its ends to corresponding cable guide rings 213. Then a large number of cables 131 are distributed vertically along the supporting poles 212 and fixed to the poles 212 with the aid of the cable guide rings 213. The cables 131 are then distributed horizontally along the frameworks 221 which also act as overhead cable racks. Thereafter, one end of each of the cables 131 is distributed horizontally on the corresponding cable supporting duct 231.

Figure 3B:
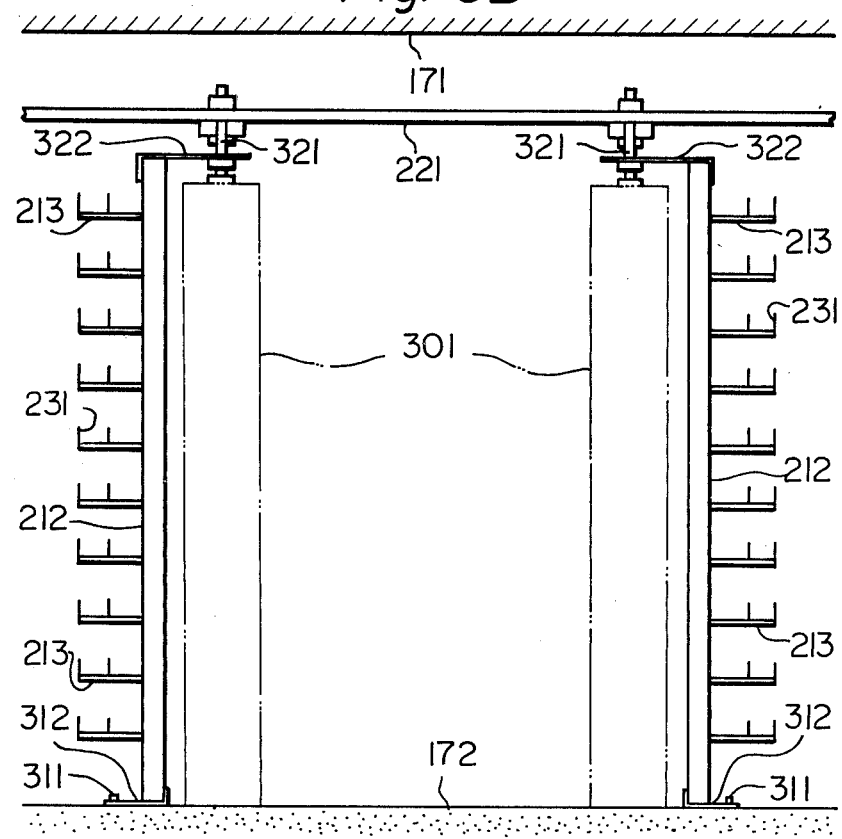
FIG. 3B is a side elevational view seen from the arrow B in FIG. 3A.

FIG. 3B is a side elevational view seen from the arrow B in FIG. 3A, however, the cables 131 are not shown in order to clarify only the construction of cable supporting racks 211 and frameworks 221 in FIG. 3A. In FIG. 3B, blocks 301 indicated by broken lines schematically show the positions at which the components 201 (FIG. 2) of the telephone exchange equipment are going to be placed. The supporting poles 212 are fixed at their bottom ends to the floor 172 by bolts 311 via brackets 312. Then the frameworks 221 are assembled near the ceiling 171 and connected to the top ends of the supporting poles 212 by suspension bolts 321 via brackets 322. The suspension bolts 321 will also be used for supporting the tops of the components (blocks 301). The cable guide rings 213 are fixed to the supporting poles 212 and rigidly support the cable supporting ducts 231.

Figure 4:
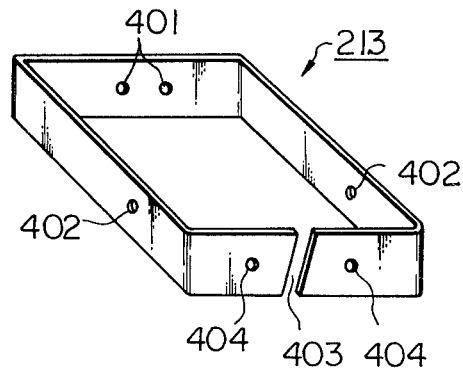
FIG. 4 is an enlarged perspective view of a cable guide ring according to the present invention.

FIG. 4 is an enlarged perspective view showing the cable guide ring 213. The reference numeral 401 indicates holes through which bolts are inserted and screwed into the supporting pole 212 (FIGS. 2, 3A and 3B), to rigidly fix the cable guide ring 213 to the supporting pole 212. The reference numerals 402 indicate holes through which bolts are inserted and screwed into the ends of the adjacent two cable supporting ducts 231 (FIGS. 2, 3A and 3B), so that the cable supporting ducts 231 are rigidly supported by the cable guide ring 213. One side of the rectangular shaped cable guide ring 213 has a slit 403 through which cables 131 (FIG. 3A) are introduced one by one into the cable guide ring 213. The cable guide ring 213 is produced by bending a belt-like iron plate into rectangular shape. The numerals 404 indicate threaded holes into which bolts are screwed to attach the protective cover 241 (FIG. 2) to the cable guide ring 213.

Figure 5:
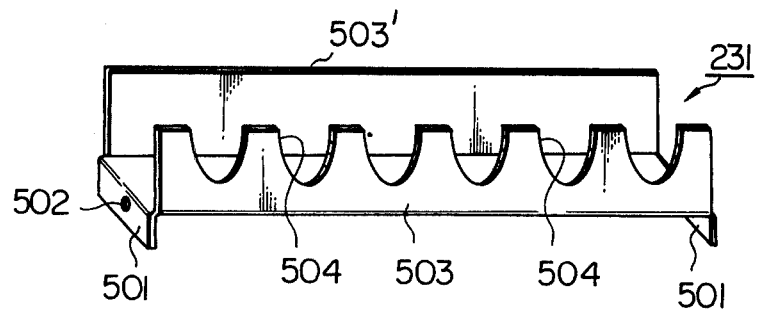
FIG. 5 is an enlarged perspective view of the cable supporting duct in FIG. 3A.

FIG. 5 is an enlarged perspective view showing the cable supporting duct 231. The duct 231 has tongue plates 501 at both its ends. Each of the plates 501 has a threaded hole 502, and a bolt is screwed into the threaded hole 502 through the hole 402 of the cable guide ring 213 (FIG. 4) so that the cable supporting duct 231 is rigidly supported by the cable guide ring 213. The duct 231 has long sides 503 and 503' which extend parallel to each other. The long side 503 has a plurality of U-shaped hang-on-grooves 504. It should be noted that since the cables are distributed straight from one electronic control unit to the others by using the ducts 231, the total length of the cables is extremely shortened. Accordingly, the transmission loss in each of the cables is considerably lowered from that in the prior art.

Figure 6:
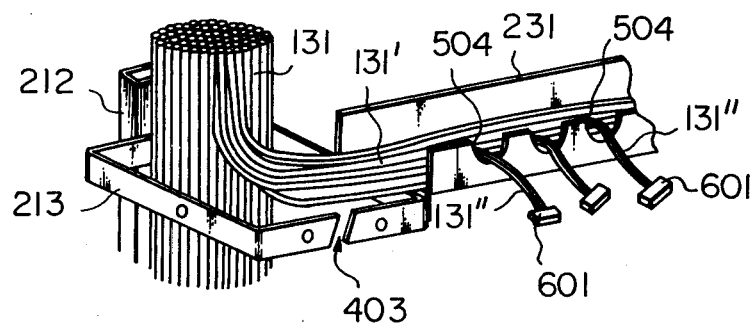
FIG. 6 is an enlarged perspective view, partially cut away, showing an arrangement of the cable guide ring and the cable supporting duct shown in FIGS. 4 and 5, respectively.

FIG. 6 is an enlarged perspective view, partially cut away, showing an arrangement of the supporting pole 212 (FIGS. 2, 3A and 3B), the cable guide ring 213 (FIG. 4), the cable supporting duct 231 (FIG. 5) and also the cables 131. When assembling the supporting pole 212, the cable guide ring 213 and the cable supporting duct 231 as shown in FIG. 6, a large number of cables 131 are introduced one by one into the cable guide ring 213, through the slit 403, and the cables 131 are then distributed vertically along the supporting pole 212. Next, some cables 131' are branched from the cables 131 and extended along and in the cable supporting duct 231. The cables 131' are to be connected to a group of said electronic control units (not shown) which will be positioned close to the cable supporting duct 231. Each of the cables 131' is cut to a desired length and further branched into a plurality of groups of cables 131''. Connectors 601 are electrically connected to the ends of the groups of cables 131''. Each group of cables 131'' is later electrically connected to a corresponding electronic control unit by way of the connector 601. The groups of cables 131'' together with the connectors 601 are temporarily hung on the corresponding U-shaped hang-on-grooves 504 until the time when the electronic control units 200 (FIG. 2) are located close to the cable supporting duct 231. As seen in FIG. 6, it is not necessary to bundle the cable 131 by using the conventional cables support wires 123 (FIG. 1).

Figure 7:
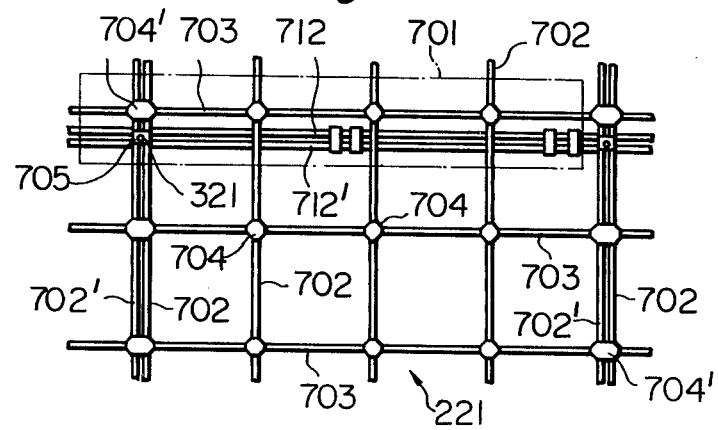
FIG. 7 is a top plan view, partially cut off, of the frameworks seen from the ceiling 171 in FIG. 3B.

The mounting apparatus according to the present invention is composed of the above mentioned cable supporting racks 211 (FIGS. 2 and 3A) and also the frameworks 221 (FIGS. 2, 3A and 3B). The frameworks 221 of the present invention will now be explained in detail. FIG. 7 is a top plan view, partially cut away, of the frameworks 221, and more specifically, FIG. 7 is a top plan view seen from the ceiling 171 in FIG. 3B. In FIG. 7, block 701, indicated by a broken line, schematically shows the position at which the component 201 (FIG. 2) is going to be located and, accordingly, the block 701 corresponds to the top of the block 301 shown in FIG. 3B. The frameworks 221 is assembled into a grid-like shape by using long pipes 702, each of which has a square cross section, and short pipes 703 each of which also has a square cross section. At the cross points where the long pipes 702 and short pipes 703 intersect, fitting metal plates 704 are applied both to the long pipe 702 and the short pipes 703. Thus the pipes 702 and 703 are rigidly assembled by using the fitting metal plates 704. Furthermore, long pipes 702' are added beside every few long pipes 702. At the cross points which are created by the double long pipes 702 and 702' and the short pipes 703, fitting metal plates 704' are applied to these pipes. Furthermore, other double long pipes 712 and 712' are arranged crosswise under the pipes 702, 702'. The double long pipes 702, 702' and 712, 712' are provided to create a main grid of the frameworks 221. The single long pipes 702 and short pipes 703 are provided to create a sub grid of the frameworks 221. The component of the telephone exchange equipment (corresponding to the block 701) is rigidly supported by one cross point of said main grid through a washer 705 by means of the suspension bolt 321 shown in FIGS. 3B and 7. The sub grid composed of the single long pipes 702 and short pipes 703 serves as a sub supporting member of the frameworks 221 and at the same time serves as overhead cable racks.

Figure 8A:
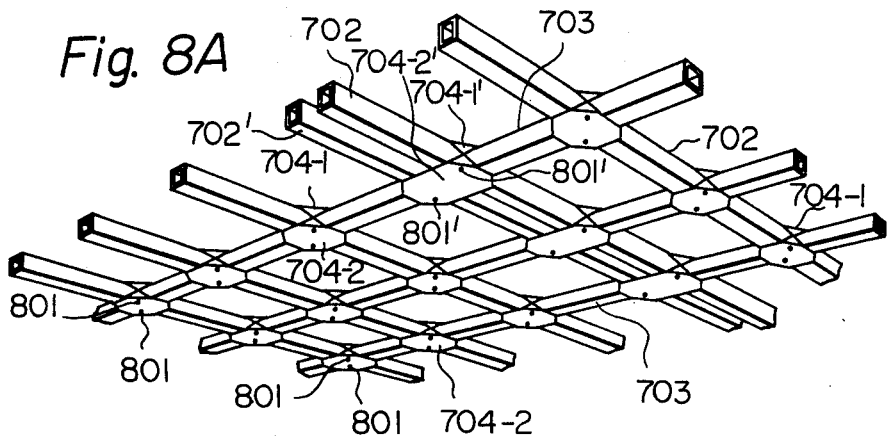
FIG. 8A is a perspective view, partially cut off, of the frameworks in FIG. 7.

FIG. 8A is a perspective view, partially cut off, of the frameworks 221, however, the long pipes 712 and 712' (FIG. 7) are not shown. In FIG. 8A, said long pipes 702, 702' and said short pipes 703 are assembled into a grid-like shape. Each of said fitting metal plates unit 704 (shown in FIG. 7) is comprised of a pair of fitting metal plates 704-1 and 704-2 as shown in FIG. 8A. Each pair of the fitting metal plates 704-1 and 704-2 sandwiches the pipes 702 and 703 at each cross point, where each of the fitting metal plates 704-1 and 704-2 is connected together by means of bolts 801. Each of the bolts 801 extends from one plate 704-1 to the other plate 704-2 at their corners without passing through the pipes 702 and 703. Similarly, each of said fitting metal plates unit 704' (shown in FIG. 7) is comprised of a pair of fitting metal plates 704'-1 and 704'-2 as shown in FIG. 8A. Each of the pairs of the fitting metal plates 704'-1 and 704'-2 is connected together by means of bolts 801'.

Figure 8B:
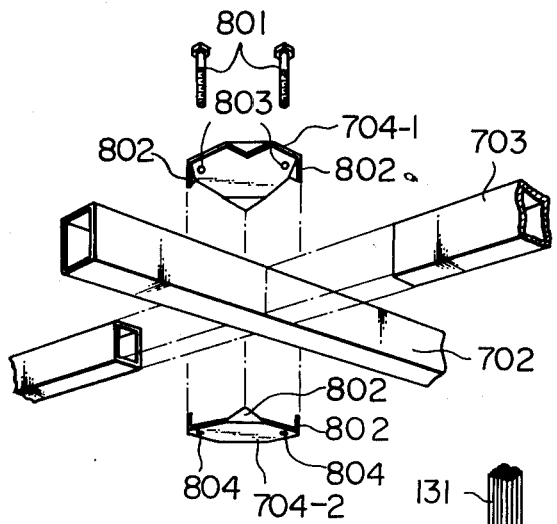
FIG. 8B is an exploded perspective view, partially cut off, of a cross point of the frameworks.

One of said cross points of said sub grid is shown in FIG. 8B. FIG. 8B is an exploded perspective view, partially cut off, of one of said cross points of the framework 221 shown in FIG. 8A. In FIG. 8B, two short pipes 703 are about to be positioned against the sides of the long pipe 702 at nearly a right angle, respectively. The two fitting metal plates 704-1 and 704-2 are about to be positioned against the top and bottom sides of the long pipe 702, respectively. Since the fitting metal plates 704-1 and 704-2 have a projection 802 at each of their four corners, both short pipes 703 are fixed at a predetermined position on the long pipe 702 and at exactly a right angle thereto, respectively. Then, bolts 801 are inserted from the fitting metal plate 704-1 through holes 803, respectively, into threaded holes 804, respectively, of the fitting metal plate 704-2. As a result, one rigid cross point comprised of the pipes 702, 703 and fitting metal plates 704-1, 704-2 is formed.

The frameworks 221 explained above in detail with reference to FIGS. 7, 8A and 8B have following advantages. Since the long pipes 702 and the short pipes 703 are arranged in the same horizontal plane, the surface of the frameworks 221 is flat. Therefore, the cables are distributed on the frameworks 221 without damage. In the prior art, since first long pipes extend along lines and second long pipes are located above the first long pipes and are extended along rows, the surface of the frameworks of the prior art is rough. Accordingly, many flat plates are provided in order to cover the roughness. Furthermore, in the present invention, since there is no roughness on the top of the frameworks, it is easy for the workers who work on the frameworks to distribute the cables.

Another advantage of the frameworks of the present invention is that, since the mesh size of the frameworks is freely selected from a range between small and large, the designer who designs the frameworks can do so at his will.

Figure 9:
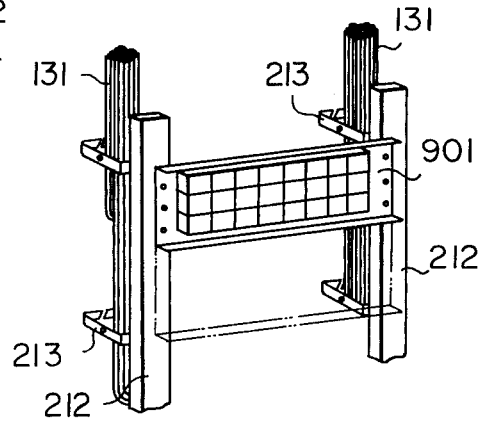
FIG. 9 is a perspective view, partially cut away, showing an arrangement of a terminal box and supporting poles, according to the present invention.

The above explained supporting poles 212 (FIG. 2, 3A, 3B and 6) are utilized for supporting the frameworks 221 and the cable guide rings 213. Further, the supporting poles 212 can be utilized for holding other devices, for example a terminal box. In the prior art, the terminal box is located on one of the shelves 203 (FIG. 2) or the terminal box is located at another place near the mounting frame 202. However, in the present invention, the terminal box may be held by the supporting poles 212. FIG. 9 is a perspective view, partially cut away, showing the arrangement of a terminal box and supporting poles. In FIG. 9, the terminal box 901 is held by two adjacent supporting poles 212. The terminal box 901 is located between the supporting poles 212 and the rear of the component 201 (FIG. 2).

The mounting apparatus according to the present invention is composed of the above mentioned cable supporting racks 211 (FIGS. 2, 3A, 4 and 6), the frameworks 221 (FIGS. 2, 3A, 3B, 7, 8A and 8B), the cable supporting duct 231 (FIGS. 2, 3A, 3B, 5 and 6) and, also, a frame which packages the printed circuit boards, a plurality of relays and a plurality of integrated circuit (IC) elements. The frame, printed circuit boards, relays and IC elements comprise said electronic control unit 200 (FIG. 2). Generally, the electronic control unit 200 has to be light in weight, and should have good heat dissipation properties. Further, it is preferable that, in the electronic control unit 200, the lead wire connections between connectors mounted in the unit 200 and both relays and IC elements are easily accomplished.

Figure 10:
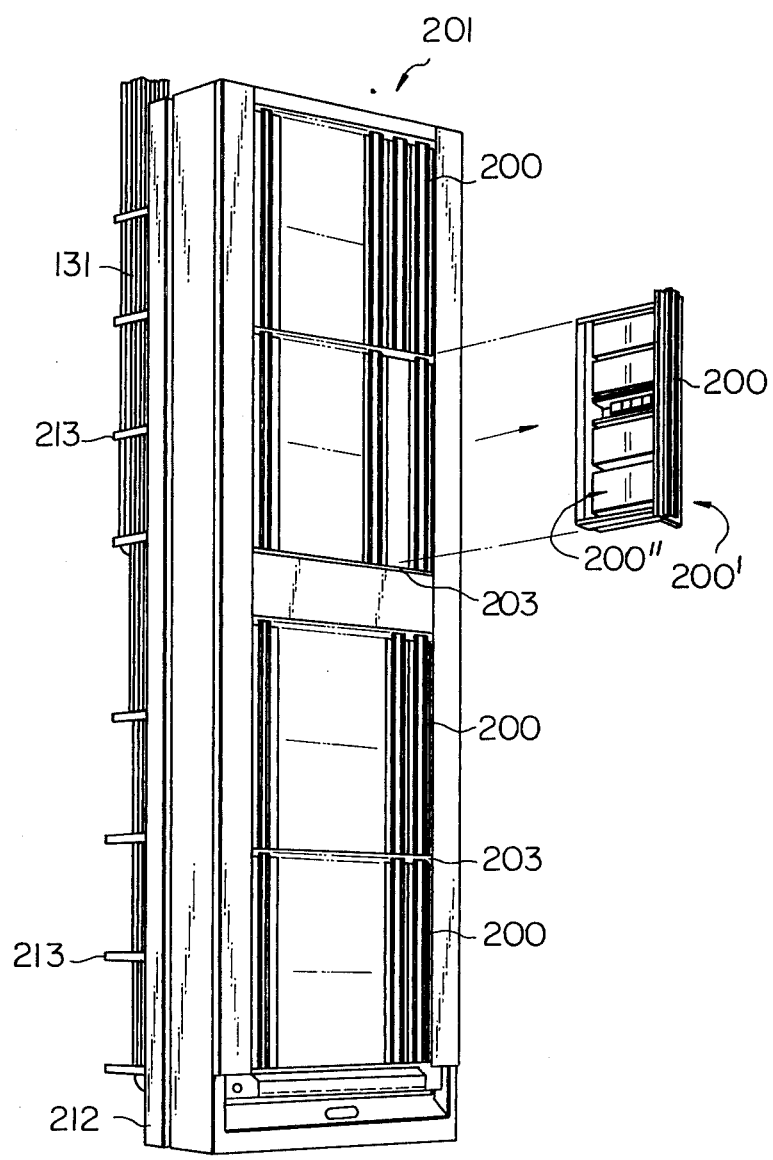
FIG. 10 is a perspective view of one component of the telephone exchange equipment shown in FIG. 2.

FIG. 10 is a perspective view of one component 201 (FIG. 2) of the telephone exchange equipment of the present invention, where one of the electronic control units 200 is pulled out from a shelf 203. In FIG. 10, the left side surface 200" of the electronic control unit 200 is shown.

Figure 11:
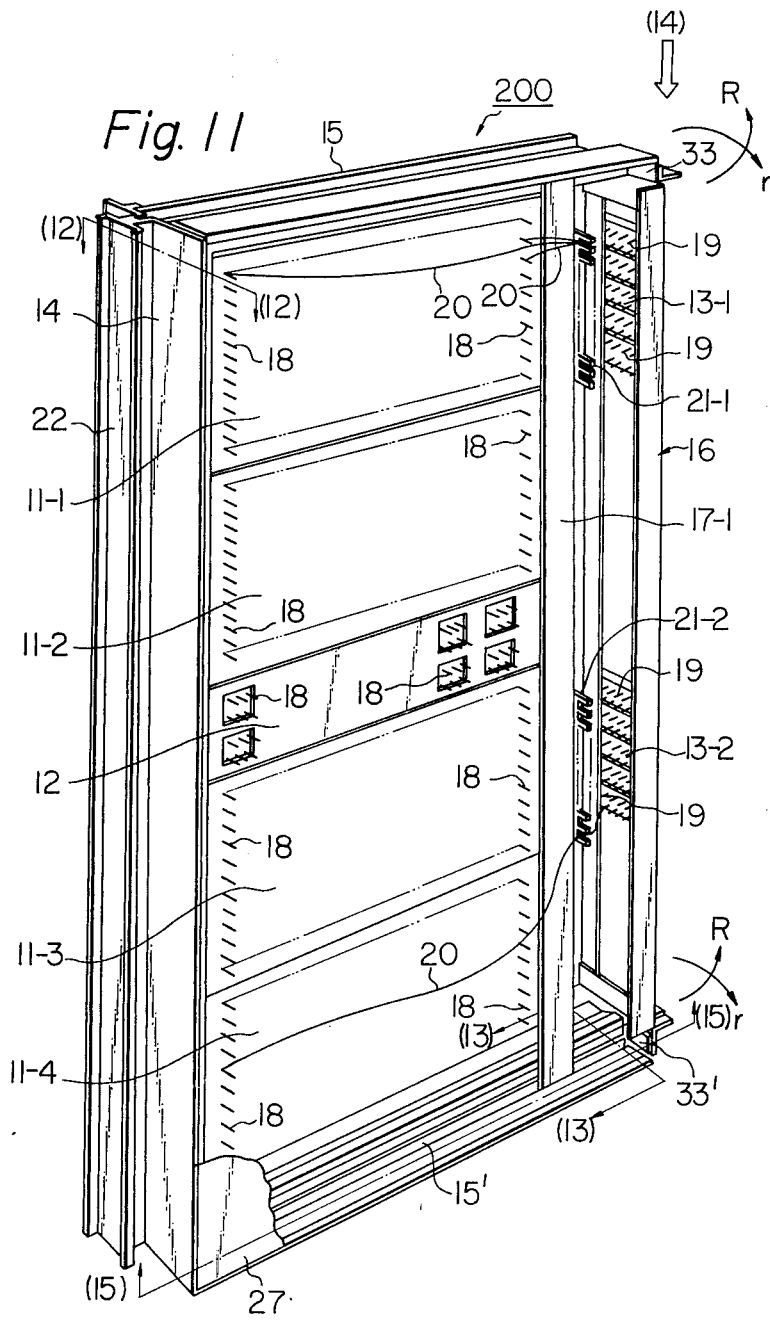
FIG. 11 is an enlarged perspective view of the right side surface of an electronic control unit in FIG. 10.
Figure 12:
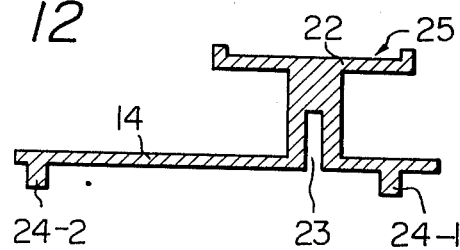
FIG. 12 is a cross sectional view of a front plate and a handle taken along the arrows (12) in FIG. 11.

FIG. 11 is an enlarged perspective view of the right side surface 200' (FIG. 10) of the electronic control unit 200. In FIG. 11, four printed circuit boards 11-1 through 11-4, a printed circuit board 12 and connectors 13-1 and 13-2 are packaged by the frame of the present invention. Said relays and IC elements are mounted on the printed boards 11-1 through 11-4 and 12, but are not shown in FIG. 11. Connectors 601 shown in FIG. 6 are electrically connected to the corresponding connectors 13-1 and 13-2 located at the rear face of the unit 200, as shown in FIG. 11. The frame of the present invention is mainly comprised of a front plate 14, a top joining member 15, a bottom joining member 15', a connector holding member 16, a first supporting plate 17-1 and a second supporting plate (not shown). A shielding plate 27 (one corner part of the plate 27 is shown) is provided, if necessary, and held by the top and bottom joining members 15 and 15'. Conductor pins 18 which are projected from the bottoms of the printed circuit board are connected to the conductor pins 19 of the connectors 13-1 and 13-2 by means of lead wires 20. 21-1 and 21-2 indicate plates having many grooves through which each group of lead wires 20 is fixed. The reference numeral 22 indicates a handle which is utilized for pulling out the electronic control unit 200 from the shelf 203 (FIG. 10). The handle 22 is made as one body with the front plate 14. FIG. 12 is a cross sectional view of the front plate 14 and the handle 22 taken in the direction of the arrow (12) in FIG. 11. In FIG. 12, the front plate 14 has a trench 23 and two projections 24-1 and 24-2. The handle 22 has a wide hollow 25, into which hollow 25 a label (not shown) may be inserted. The label may be used for indicating the electronic function of the electronic control unit 200. The front plate 14 together with the projections and the handle 22 together with the trench and the wide hollow, are preferably made from an extruded aluminum. Accordingly, the front plate 14 and the handle 22 are suitable for mass-production and are light in weight. Further, the handle 22 is useful for dissipating heat from the printed circuit boards and, accordingly, the electronic control unit has good heat dissipation properties. This is because, firstly, the handle acts as heat dissipating fins for the electronic control unit 200 and, secondly, every adjoining two handles form a channel therebetween which extends vertically and heat dissipated from relays and IC elements goes smoothly out from the electronic control unit through the channel. The trench 23 is used for fixing said second supporting plate to the front plate 14 by means of self tapping screws which are screwed into the trench 23 through the second supporting plate.

Figure 13A:
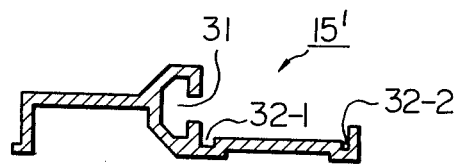
FIG. 13A is a cross sectional view of a bottom joining member taken along the arrows (13) in FIG. 11.
Figure 13B:
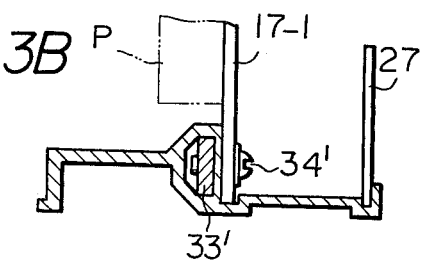
FIG. 13B is a cross sectional view of the bottom joining member in FIG. 13A provided further with cooperating members therewith.

FIG. 13A is a cross sectional view of the bottom joining member 15' taken in the direction of the arrow (13) in FIG. 11. The top joining member 15 has the same cross sectional shape as that of the joining member 15'. In FIG. 13A, the bottom joining member 15' has a groove 31 and two trenches 32-1 and 32-2. The bottom joining member 15' (and also the top joining member 15) is preferably made from extruded aluminum. Accordingly, the frame of the electronic control unit is suitable for mass-production and is light in weight. Further, the shape of the member 15' is suitable for dissipating heat from the printed circuit boards and, accordingly, the frame of the electronic control unit has good heat dissipation properties. The trench 32-1 is utilized for holding the bottom end of the first supporting plate 17-1 and also the second supporting plate (not shown in FIG. 13B). IN FIG. 13B, the first supporting plate 17-1 (as is the second supporting plate which is not shown) is fixed to the member 15' by means of both a bottom liner plate 33' and a screw 34'. The first supporting plate 17-1 together with the second supporting plate rigidly support said printed circuit board indicated by symbol P in FIG. 13B. The liner plate 33' is L-shaped and one end of the plate 33' can be seen in FIG. 11, where one end of a top liner plate 33 is also shown. The trench 32-2 in FIG. 13A is used for clutching the end of the shielding plate 27, a part of which is shown in FIG. 11.

As shown in FIG. 11, since each of the conductor pins 18 extends in one direction and each of the conductor pins 19 extends in another direction, which is perpendicular to the pin 18 direction, it is not easy for workers to connect the lead wires 20 from the conductor pins 18 to the conductor pins 19. Therefore, if it is necessary to connect additional lead wires 20 in the electronic control unit 200 when the telephone exchange equipment is under construction, the construction completion time will be delayed. Consequently, the difficulty in connecting lead wires from the pins 18 to the pins 19 should be reduced so that carrying out said connections will extend the construction completion time as little as possible. For this purpose the connector holding member 16 is so constructed that it can be rotated in the direction of the arrow R in FIG. 11.

Figure 14:
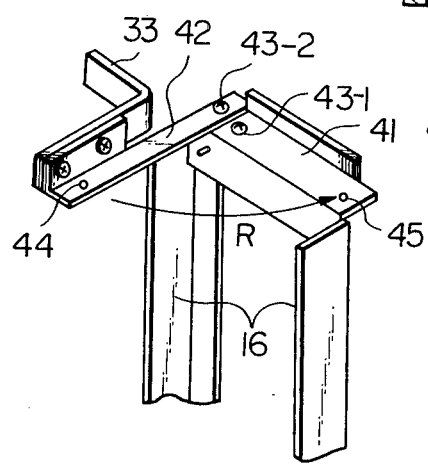
FIG. 14 is a perspective view partially cut away, of a top linear plate and a connector holding member seen from the arrow (14) in FIG. 11 when the connector holding member has rotated in the direction of the arrow R in FIG. 11.

FIG. 14 is a perspective view, partially cut away, of the L-shaped top liner plate 33 and the connector holding member 16 seen from the arrow (14) in FIG. 11 when the connector holding member 16 has been rotated in the direction of the arrow R. In FIG. 14, the reference numeral 41 represents a top connecting bar and the reference numeral 42 represents a top clamping bar. First, holes 44 and 45 face each other and a screw 43-1 is inserted therethrough (not shown). When the screw 43-1 is removed from holes 44 and 45, the connector holding member 16 (the connectors 13-1 in FIG. 11 are not shown) can be rotated in the direction of the arrow R, with a screw 43-2 acting as a central axis of the rotation (R).

Figure 15A:
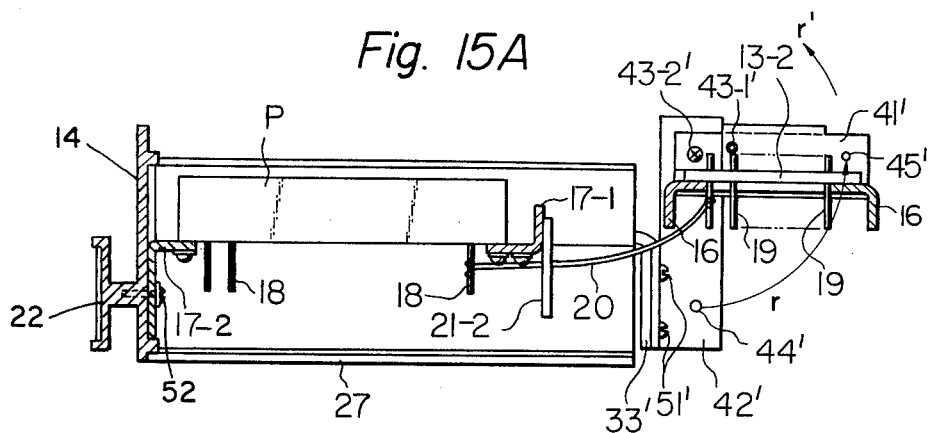
FIG. 15A is a bottom view of the electronic control unit 200 taken along the arrows (15) in FIG. 11 when the connector holding member has rotated in the direction of the arrow R in FIG. 11 and with P reversed.

FIG. 15A is a bottom view of the electronic control unit 200 taken in the direction of the arrow (15) in FIG. 11 when the connector holding member 16 has been rotated in the direction of the arrow r. In FIG. 15A, a screw 43-2' acts as a central axis of the rotation r. The screw 43-2' is held by a bottom clamping bar 42' which is rigidly supported by the bottom liner plate 33' by means of screws 51'. The holes 44° and 45° correspond to the holes 44 and 45 of FIG. 14, respectively. A bottom connecting bar 41' corresponds to the top connecting bar 41 of FIG. 14. A screw 43-1' corresponds to the screw 43-1 of FIG. 14, which screw 43-1' (and also the screw 43-1) may be utilized as a stopper which stops further rotation of the member 16 in the direction of the arrow r. As seen from FIG. 15A, the conductor pins 19 of the connector 13-2 (and also 13-1 of FIG. 11) are pointed in the same direction as the conductor pins 18. That is, the pins 18 become parallel with the pins 19. Accordingly, it is relatively easy for workers to connect the lead wires 20 from the pins 18 to the corresponding pins 19. In FIG. 15A, the reference numeral 17-1 represents the first supporting plate, and both the first and second supporting plates 17-1, 17-2 rigidly support the printed circuit board P (refer to FIG. 13B). The second supporting plate 17-2 is rigidly fixed to the front plate 14 by means of the self-tapping screw 52 which is screwed into the trench 23 (FIG. 12). The numeral 27 indicates the shielding plate (FIGS. 11 and 13B). The plate 21-2 (FIG. 11) is used for arranging the lead wires 20 in some type of logical or uncluttered order.

Figure 15B:
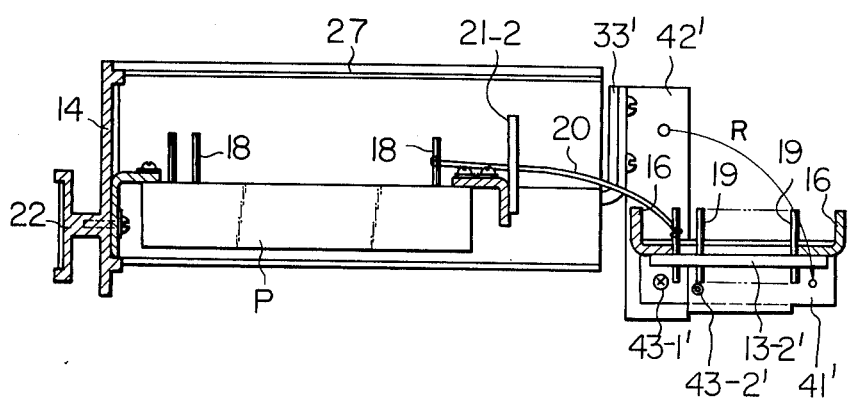
FIG. 15B is a bottom view of the electronic control unit 200 taken along the arrows (15) in FIG. 11 when the connector holding member has rotated in the direction of the arrow γ in FIG. 11.

It should be recognized that, as shown in FIG. 15B, when the pins 18 are directed in the opposite direction with respect to the arrangement shown in FIG. 15A, the connector holding member 16 can be rotated in a direction along the arrow R, where the screw 43-1' and also the screw 43-1 (not shown) act as a central axis of the rotation R.

What is claimed is:

1. A mounting apparatus for a telephone exchange unit for communication signals, said telephone exchange unit including a plurality of components, each of which has a mounting frame for mounting a plurality of electronic control units thereon, said mounting apparatus comprising: means for both supporting said components and for distributing a large number of communication signal cables between one component and other components including: supporting poles which are supported at their bottom ends at predetermined respective positions along and close to a respective position at which the component will be located, and frameworks which are assembled horizontally above said supporting poles and rigidly fixed to the top ends of said supporting poles so as to form one body, wherein both said supporting poles and said frameworks are constructed so as to permit the pre-arranging of said communication signal cables by the time a plurality of said components are positioned close to corresponding supporting poles.

2. A mounting apparatus for a telephone exchange unit as set forth in claim 1, wherein each of said supporting poles is provided with a plurality of cable guide rings arranged with a predetermined pitch along a longitudinal axis of the supporting pole, and wherein communication signal cables which are wired between electronic control units of one of said components and corresponding electronic control units of other components, are distributed vertically by way of said cable guide rings.

3. A mounting apparatus for a telephone unit as set forth in claim 2, wherein each of said cable guide rings is provided with a slit through which the communication signal cables are introduced into the cable guide ring one by one.

4. A mounting apparatus for a telephone exchange unit as set forth in claim 2, wherein every two horizontally adjacent cable guide rings support cable supporting ducts therebetween, said cable supporting ducts and said cable supporting poles forming grid-like cable guide paths so that some signal cables which are branched from the signal cables distributed vertically in the cable guide rings are distributed in said cable supporting ducts and then connected to the electronic control units which will be located close to the corresponding cable supporting duct.

5. A mounting apparatus for a telephone exchange equipment unit as set forth in claim 4, wherein each of said cable supporting ducts has a plurality of hang-on-grooves each of which holds a group of communication signal cables temporarily until the time the electronic control units are located close to the cable supporting ducts.

6. A mounting apparatus for a telephone exchange unit as set forth in claim 4, wherein each two adjacent supporting poles further support a terminal box.

7. A mounting apparatus for a telephone exchange equipment unit as set forth in claim 1, wherein the frameworks are assembled into a form of grids by using a plurality of long pipes of square shaped cross-section and a plurality of short pipes, of square shaped cross-section wherein every two said short pipes abut against two sides of one of said long pipes at every cross point of said grids, so that said frameworks are assembled in one horizontal plane.

8. A mounting apparatus for a telephone exchange unit as set forth in claim 7, wherein every two short pipes are fixed to one of the long pipes by means of a pair of fitting metal plates, and bolts which connect the pair of fitting metal plates and also clamp them against the two short pipes and the one long pipe.

9. A mounting apparatus for a telephone exchange unit as set forth in claim 8, wherein each of the fitting metal plates has four projections at its four corners, which projections guide and fix the two short pipes at desired positions on both sides of the long pipe.

10. A mounting apparatus for a telephone exchange unit comprising: means for both supporting components of said unit and for distributing a large number of communication signal cables between one component and other components including supporting poles which are supported at their bottom ends at predetermined respective positions, along and close to which positions a plurality of components of the telephone exchange equipment will be located, and frameworks which are assembled horizontally above said supporting poles and rigidly fixed to the top ends of said supporting poles, wherein both said supporting poles and said frameworks are constructed by the time a plurality of said components are positioned close to corresponding supporting poles, each of said components including a frame which packages electric parts and forms an electronic control unit, a plurality of which electronic control units form each of the components of the telephone exchange unit wherein said frame is comprised of a front plate, a top joining member, a bottom joining member, a connector holding member, a first supporting plate and a second supporting plate, wherein both the first and second supporting plates hold said electric parts and both said first and second supporting plates are supported at their respective top and bottom ends by said top and bottom joining members, respectively, and both the top and bottom joining members, said front plate and said connector holding member are assembled into the frame.

11. A mounting apparatus for a telephone exchange unit as set forth in claim 10, wherein the front plate is provided with a handle along a longitudinal axis thereof, which handle has a T-shaped cross section.

12. A mounting apparatus for a telephone exchange unit as set forth in claim 10, wherein each of the top and bottom joining members is provided with a long groove into which a liner plate is inserted and held therein, and wherein the connector holding member is fixed at its top and bottom ends by the liner plates.

13. A mounting apparatus for a telephone exchange unit as set forth in claim 10, wherein the connector holding member is rotatably supported at its top and bottom ends by the top and bottom joint members, respectively.

14. A mounting apparatus for a telephone exchange unit as set forth in claim 12, wherein the holding member is rotatable with respect to the top and bottom joint members in either a direction toward the right sides of the two joint members or a direction toward the left sides of the two joint members.

15. A mounting apparatus for a telephone exchange unit as set forth in claim 9, wherein the frame which packages the electric parts of the electronic control unit is made from an extruded aluminum.

16. A mounting apparatus for exchange equipment for communication signals comprising: means for both supporting components of said equipment and for distributing a large number of communication signal cables between one component and other components including: supporting poles which are supported at their bottom ends at predetermined respective positions, along and close to which positions a plurality of components of the communication signals exchange equipment will be located, and frameworks which are assembled horizontally above said supporting poles and rigidly fixed to the top ends of said supporting poles, wherein both said supporting poles and said frameworks are constructed by the time a plurality of said components are positioned close to corresponding supporting poles, each of said supporting poles being provided with a plurality of cable guide rings arranged with a predetermined pitch along a longitudinal axis of the supporting pole, and wherein communication signal cables which are wired between electronic control units of one of said components and corresponding electronic control units of other components, are distributed vertically by way of said cable guide rings, and wherein two adjacent supporting poles support cable supporting ducts each of which is arranged horizontally, so that some communication signal cables which are branched from the communication signal cables distributed vertically in the cable guide rings are distributed in said cable supporting ducts and then connected to the electronic control units which will be located close to the corresponding cable supporting duct, and wherein each of said cable supporting ducts has a plurality of hang-on-grooves each of which holds a group of communication signal cables temporarily until the time the electronic control units are located close to the cable supporting ducts, and wherein at least one end of said group of cables has connectors thereon.

17. A mounting apparatus for exchange equipment for communication signals comprising: means for both supporting components of said equipment and for distributing a large number of communication signal cables between one component and other components including; supporting poles which are supported at their bottom ends at predetermined respective positions, along and close to which positions a plurality of components of the exchange equipment for communication signals will be located, and frameworks which are assembled horizontally above said supporting poles and rigidly fixed to the top ends of said supporting poles, wherein both said supporting poles and said frameworks are constructed by the time a plurality of said components are positioned close to corresponding supporting poles, and wherein the frameworks are assembled into a form of grids by using a plurality of long pipes and a plurality of short pipes and wherein every two said short pipes abut against two sides of one of said long pipes at every cross point of said grids, so that said frameworks are assembled in one horizontal plane, and wherein said frameworks are further comprised of a plurality of additional long pipes which are provided to create a main grid of said frameworks and crossing said plurality of said first long pipes under said one horizontal plane thereof.

18. A mounting apparatus for exchange equipment for communication signals as set forth in claim 17, wherein a plurality of suspension means are provided at cross points of said main grid rigidly support said plurality of mounting frames of the exchange equipment.

* * * * *

UNITED STATES PATENT AND TRADEMARK OFFICE
CERTIFICATE OF CORRECTION

PATENT NO. : 4,158,754
DATED : June 19, 1979
INVENTOR(S) : JIMPACHI YONEZAKI ET AL.

It is certified that error appears in the above-identified patent and that said Letters Patent are hereby corrected as shown below:

Col. 2, after line 46, add heading --BRIEF DESCRIPTION OF THE DRAWINGS--;

Col. 3, line 48, "101" (second occurrence) should be --101"--;

Col. 9, line 45, "member15'" should be --member 15'--;

Signed and Sealed this

Twenty-third Day of October 1979

[SEAL]

Attest:

RUTH C. MASON
Attesting Officer

LUTRELLE F. PARKER
Acting Commissioner of Patents and Trademarks